Jan. 12, 1960  F. C. FIELD  2,920,796
DISPENSER WITH ROTARY MEASURING VALVE
Filed June 19, 1958  3 Sheets-Sheet 1

INVENTOR.
FRANK C. FIELD
BY
ATTORNEY

Jan. 12, 1960 F. C. FIELD 2,920,796
DISPENSER WITH ROTARY MEASURING VALVE
Filed June 19, 1958 3 Sheets-Sheet 2

INVENTOR.
FRANK C. FIELD
BY
ATTORNEY

Jan. 12, 1960      F. C. FIELD      2,920,796
DISPENSER WITH ROTARY MEASURING VALVE
Filed June 19, 1958      3 Sheets-Sheet 3
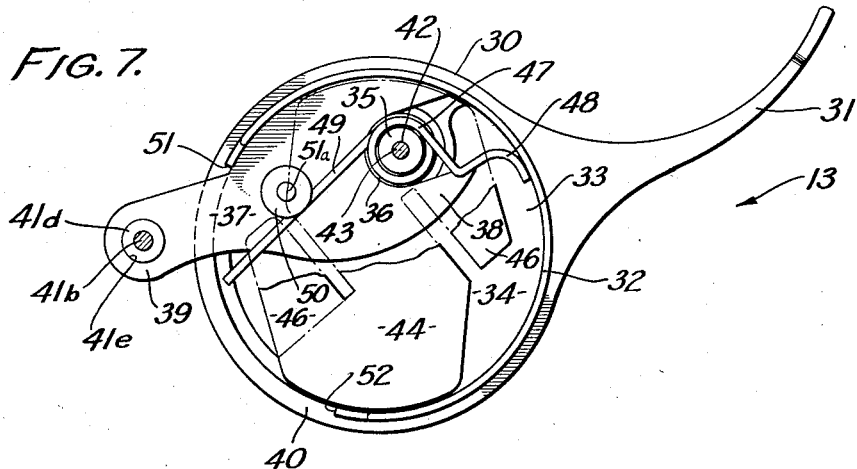
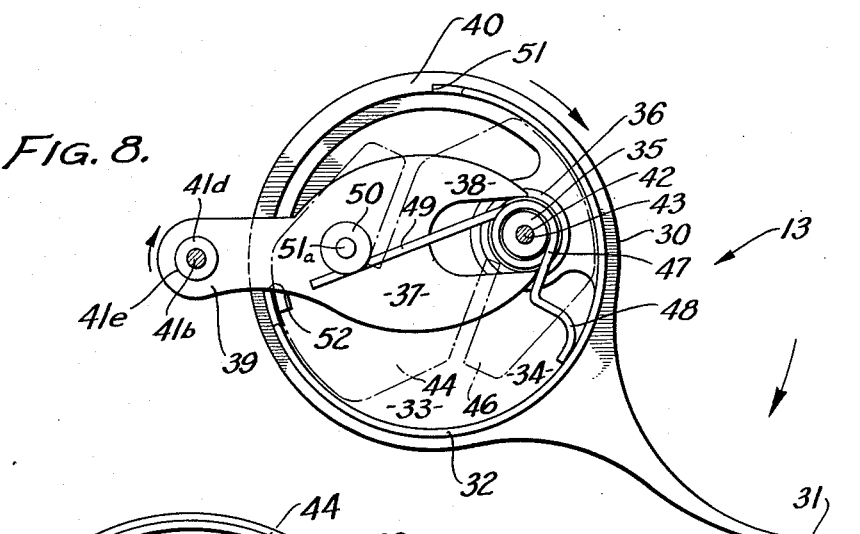
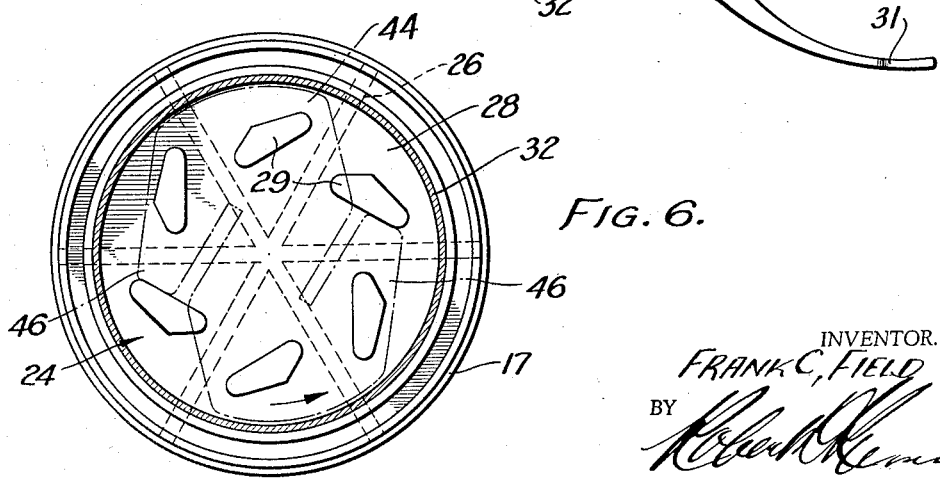
INVENTOR.
FRANK C. FIELD
BY
ATTORNEY

United States Patent Office

2,920,796
Patented Jan. 12, 1960

2,920,796

DISPENSER WITH ROTARY MEASURING VALVE

Frank C. Field, Pacific Palisades, Calif., assignor to Carnation Company, Los Angeles, Calif., a corporation of Delaware Application June 19, 1958, Serial No. 743,180

6 Claims. (Cl. 222—185)

The present invention relates broadly to dispensing machines and more specifically to improvements in dispensing and measuring apparatus for dispensing material in powder form in predetermined or measured quantities, particularly such powders as are used for making chocolate or cocoa drinks and malted milk drinks.

In the design of any apparatus of this type it is a primary requisite that firstly, the apparatus be so designed that it can be easily and quickly disassembled for cleaning purposes and reassembled; secondly, that the apparatus be simple but foolproof in operation; and thirdly, that the apparatus be economical to manufacture so that the cost to the ultimate purchaser is low.

It is therefore a primary object of the present invention to provide a dispensing apparatus embodying all of the above characteristics.

A still further object of the present invention is to provide a dispensing apparatus of this type which embodies a rotary valve and a ratchet actuating means for easily and conveniently effecting rotation of said valve in predetermined increments for dispensing predetermined amounts of powder.

A still further object of the present invention is to generally improve the operation and construction of machines of this type.

Other objects and advantages of the present invention will be readily apparent to those skilled in the art upon perusal of the following description and drawings to which:

Fig. 6 is a cross sectional view taken on the line 6—6 of Fig. 4.

Fig. 7 is a sectional view taken on the line 7—7 of Fig. 2 showing the handle actuating mechanism in its at-rest position, slightly enlarged.

Fig. 8 is a view similar to Fig. 7 showing the handle actuating mechanism in its actuated position.

Figure 5:
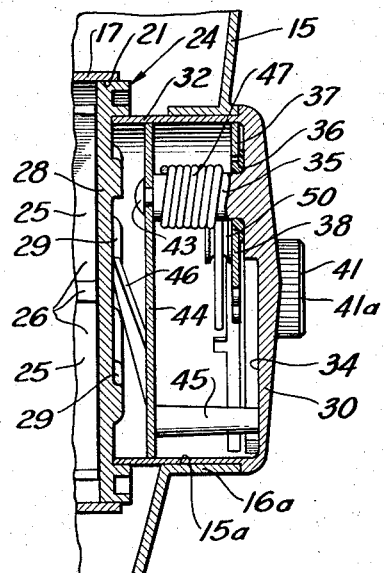
Fig. 5 is a cross sectional view taken on the line 5—5 of Fig. 4.
Figure 2:
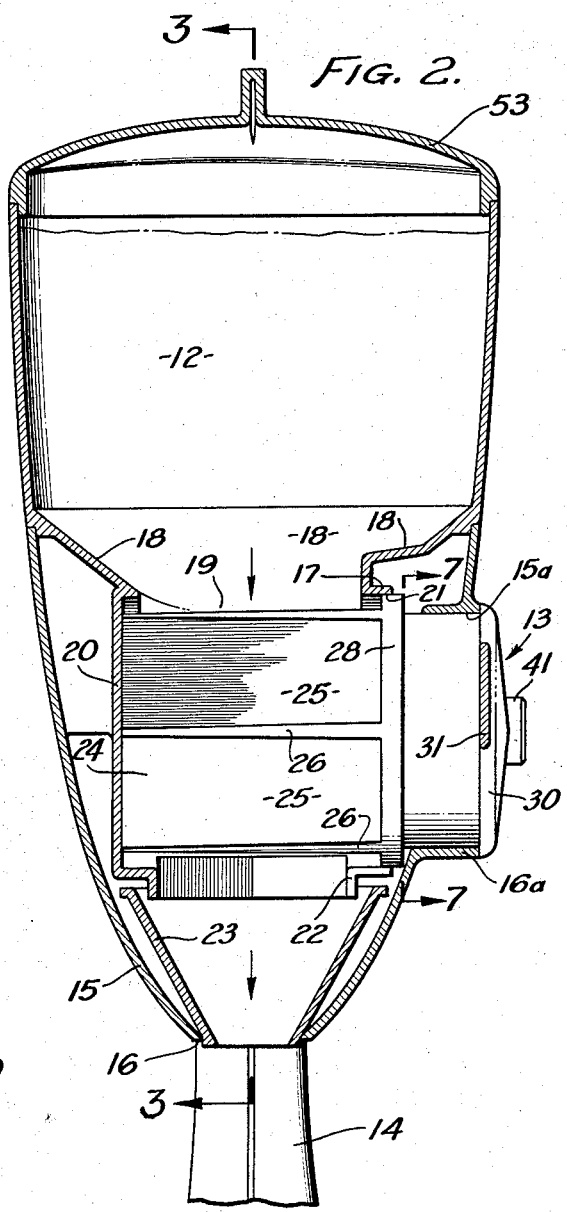
Fig. 2 is a vertical cross sectional view, with parts broken away and slightly enlarged, taken on the line 2—2 of Fig. 1.
Figure 1:
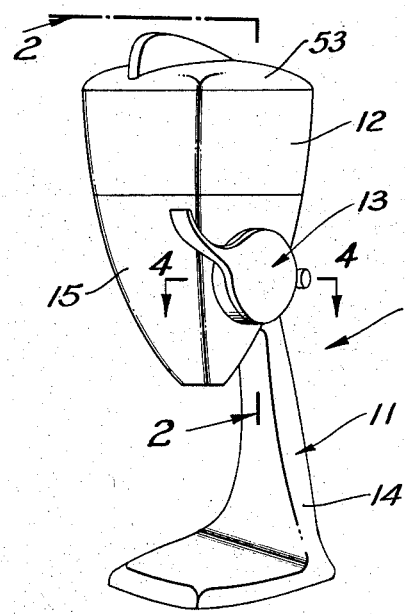
Fig. 1 is a perspective view of a dispensing machine embodying the principles of the present invention.

Referring to the drawings, the principles of the present invention are shown as being embodied in a dispensing apparatus broadly designated by the number 10. The dispenser comprises a pedestal 11 which carries a powder container 12 and a manual actuating mechanism 13 for dispensing the powder contained in container 12 in preselected quantities.

The pedestal 11 is preferably formed of metal and comprises a supporting leg portion 14 and a container support 15. The container support 15 has a discharge opening 16 through which the powder is dispensed as will be more fully appreciated hereinafter, and an opening 15a and a circular flange portion 16a in which is received the actuating mechanism 13.

The container 12 is preferably formed of plastic or other similar type material and is so shaped as to rest upon the upper edge of the container support 15. A cylindrical valve housing 17 is interconnected with the side walls of the container 12 by downwardly inclined side members 18 and define an opening 19 through which the powder flows by gravity into the valve housing 17. The valve housing 17 is closed at one end by an end wall 20 and the valve housing is coaxial with the circular flange 16a and opening 15a, and the container is so positioned on the support 15 as to position an open end 21 in alignment with the circular flange 16a. A discharge snout 22 is formed adjacent the bottom of the valve housing 17 and discharges into a tray 23 which is of truncated perimetal shape and extends slightly through the discharge opening 16.

A rotary valve 24 is rotatably received in the valve housing 17 and is of such design as to move a predetermined amount of powder, which flows by gravity through the opening 19 into the valve, into dispensing relationship with respect to the discharge snout 22 upon a predetermined rotation. The rotary valve comprises a predetermined number of compartments 25 which are formed by radial spokes or blades 26 which extend from a central hub portion 27. It will be appreciated that while the valve disclosed in the drawings consists of six compartments 25, the rotary valve can be designed to have any desired number of compartments, the only limitation being that the width of the discharge snout 22 must be slightly less than the width of any single compartment so that when the valve is moved into dispensing relationship with respect to the snout, the powder in only one compartment will be dispensed. The rotary valve has a face plate 28 and a plurality of spaced ratchet teeth 29 are formed on the outer face of plate 28. The rotary valve is received in the valve housing 17 so that plate 28 is adjacent the opening 21 and the ratchet teeth are facing outwardly.

The actuating mechanism comprises a handle housing 30 which has a handle 31 extending from one side thereof and a circular rim 32 for defining a housing 33. The circular rim 32 is of such size as to be snugly received in the circular flange 16a and opening 15a and to be rotatable therein upon movement of the handle downwardly as will be appreciated more fully hereinafter. The outer face 34 of the housing 30 has an upstanding post 35, and a suitable bushing 36, preferably formed of nylon, is received by the post 35 and positioned so that it abuts a raised portion of the face 34. A handle retainer 37 has a bifurcated end 38 which encircles the bushing 36 and an end 39 which extends through a slot 40 formed in the rim 32 on the side substantially opposite the handle 31. The end 39 of the handle retainer 37 is secured by a suitable thumb screw 41 to the container support 15.

Figure 4:
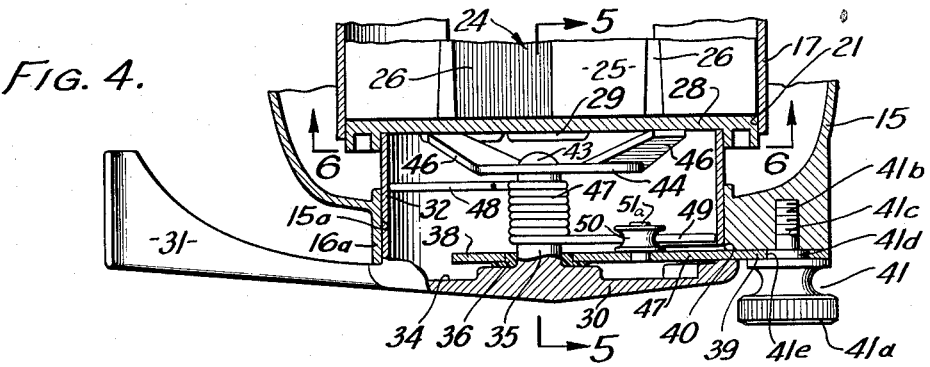
Fig. 4 is a horizontal sectional view, with parts broken away, taken on the line 4—4 of Fig. 1, slightly enlarged.
Figure 3:
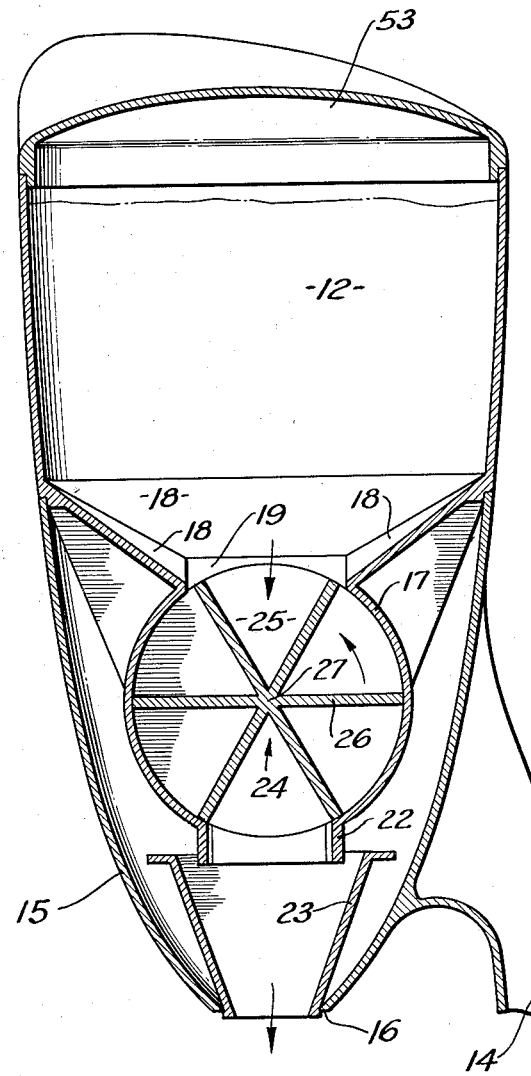
Fig. 3 is a vertical cross sectional view, with parts broken away, taken on the line 3—3 of Fig. 2.

It will be noted in viewing Fig. 4 that thumb screw 41 has a head 41a, a threaded portion 41b which is received in a threaded opening 41c, and a spacer 41d. The spacer 41d is of such width and the opening 41e is of such size as to allow the handle retainer to turn or roll slightly on the screw when the actuating mechanism is operated.

Figure 9:
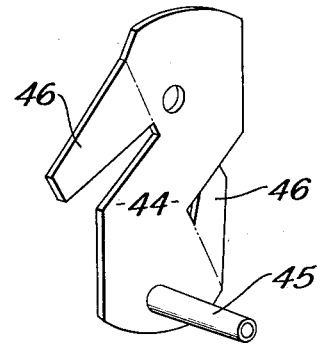
Fig. 9 is a perspective view of the ratchet pawl disclosed in Fig. 4.

The post 35 has an axially threaded opening 42 formed therein and screw 43 fixes a ratchet pawl 44 to the post 35. Referring now specifically to Fig. 9, it will be noted that the ratchet pawl is substantially S-shaped in configuration and is formed with a support leg 45 for retaining the pawl in a pre-determined level position with respect to post 35. The pawl 44 has a pair of upwardly inclined fingers 46 which are so spaced as to be in engaging relationship with radially opposed teeth 29, see for example Fig. 6. The pawl 44 is formed of suitable flexible material, such as for example nylon, so that the fingers are sufficiently flexible to move over the pawls 29 when the handle housing 30 is urged to move from its actuated or depressed position to its at rest position.

A torsion spring 47 is received by the post 35 and one end thereof 48 is urged to move against the inner surface of the rim 32 adjacent to the handle 31 and the other end thereof 49 is retained by a stop 50 which is carried on a shaft 51a extending upwardly from the handle retainer 37 adjacent to the end 39 thereof. It will be appreciated that the force exerted by spring 47 is sufficient to urge the handle retainer 37 against a stop 51 defining one end of the slot 40.

In operation, it will be appreciated, of course, that when the handle 31 is depressed downwardly, that the rotary valve is rotated to an extent sufficient to move the compartment 25 adjacent the snout 22 into dispensing relationship with respect to the snout 22, the radially opposed compartment, which is empty, moving into receiving relationship with respect to opening 19, the powder in container 12 filling this compartment by gravity. More specifically, the teeth 29 are so spaced on the face 28 as to move the compartments 25 in pre-determined increments in dispensing relationship with respect to the snout 22. Since the handle retainer 37 is retained by the thumb screw 41, the handle housing 30 moves relative to the handle retainer when sufficient force is exerted against handle 31 to depress the handle. Referring specifically to Figs. 6, 7 and 8, it will be noted that the force exerted by torsion spring 47 urges the handle housing 30 to move to an extent sufficient to move the handle retainer into abutting relationship with respect to the stop 51. In this position, the fingers 46 of the pawl 44 are in engagement with radially opposed teeth 29 and one of the compartments 25 is located in dispensing relationship with respect to the snout 22. When the handle 31 is moved downwardly, the handle housing 30 is turned relative to the handle retainer within the limits defined by slot 40 until the handle retainer moves into abutting relationship with respect to a stop 52 which defines the other end of the slot 40. The pawl 44 is moved with the handle housing and through the engagement of the fingers 46 with radially opposed teeth 29 urges the rotary valve to rotate to an extent sufficient to move the adjacent compartment into dispensing relationship with respect to the snout. When the handle 31 is released, the force exerted by the torsion spring urges the handle housing to move into the position shown in Fig. 7, the flexible fingers 46 of the pawl 44 moving over and into engaging relationship with the succeeding pair of radially opposed teeth 29.

It will also be appreciated that the present machine can be easily disassembled for cleaning purposes. For example, when the thumb screw 41 is removed, the handle housing 30 and the container 12 with the rotary valve can be removed from the container support 15 along with the tray 23. To assemble this machine, the reverse procedure is followed.

Suitable top lid 53 is provided for well-known purposes.

What is claimed is:

1. A dispenser comprising in combination a pedestal having a container support and a discharge opening formed in said support, a powder container carried by said container support and having a discharge opening in alignment with the first-mentioned opening, a rotary valve rotatably mounted between said openings and forming a plurality of compartments of pre-determined size adapted to be moved successively into register with said first-mentioned opening, said valve having an end face upon which are formed a plurality of circumferentially spaced teeth, and means for effecting rotation of said valve step by step to move said compartments successively into dispensing relationship with respect to said first-mentioned opening, said means comprising a handle housing rotatably mounted in end to end relationship with respect to said end face, a mounting post fixed with said handle housing, a pawl fixed with said mounting post and having a flexible finger extending into the path of travel of said teeth so as to engage one of said teeth and effect rotation of said valve upon rotation of said handle housing from an at-rest position to a depressed position, said handle housing having a slot formed therein, a handle retainer having a bifurcated end received by said post and an end extending through said slot, means for holding said handle container against rotation, and a torsion spring carried by said post and anchored at one end with said handle retainer for urging said handle housing to move into its at-rest position.

2. A dispenser comprising in combination a pedestal having a container support and a discharge formed in said support, a powder container carried by said container support and having a discharge opening in alignment with the first-mentioned opening, a rotary valve rotatably mounted between said openings and forming a plurality of compartments of pre-determined size adapted to be moved successively into register with said first-mentioned opening, said valve having an end face upon which are formed a plurality of circumferentially spaced teeth, and means for effecting rotation of said valve step by step to move said compartments successively into dispensing relationship with respect to said first-mentioned opening, said means comprising a handle housing rotatably mounted in end to end relationship with respect to said end face, a mounting post fixed with said handle housing, a pawl fixed with said mounting post and having a pair of flexible fingers extending into the path of travel of said teeth so as to engage a pair of radially opposed teeth and effect rotation of said valve upon rotation of said handle housing from an at-rest position to a depressed position, said handle housing having a slot formed therein, a handle retainer having a bifurcated end received by said post and an end extending through said slot, means for holding said handle container against rotation, and a torsion spring carried by said post and anchored at one end with said handle retainer for urging said handle housing to move into its at-rest position.

3. A dispensing machine comprising a pedestal having a container support, a powder container carried by said container support and having a valve housing open at one end and a discharge opening through which the powder is dispensed, a rotary valve received in said valve housing and turnable therein, said rotary valve having a plurality of compartments for dispensing pre-determined quantities of said powder upon rotation of the valve, said valve having an end face upon which are formed a plurality of teeth, an actuating mechanism comprising a handle housing rotatably carried by said container support and movable from an at-rest position to a depressed position, a pawl fixed with said handle housing and positioned in engagement with one of said teeth upon rotation of said handle housing from said at-rest position to said depressed position, a handle retainer, one end of which is rotatably engaged with said handle housing and the other end of which is fixed with said container support for holding said handle retainer against rotation upon rotative movement of said handle housing, said handle housing having formed thereon spaced stops engagable with said handle retainer upon rotation of said handle housing for defining the degree of rotative movement of said handle housing from its at-rest position to its depressed position, and means for urging said handle housing to move into its at-rest position, said teeth being so spaced as to effect movement of said rotary valve to an extent that said compartments are successively moved into dispensing relationship upon said handle housing being successively actuated.

4. The actuating mechanism defined in claim 3 further characterized by resilient means being interconnected with said handle retainer and said handle housing for resiliently urging said handle housing to move into its at-rest position.

5. A dispenser comprising in combination a pedestal having a container support and a discharge opening formed in said support, a powder container carried by said container support and having a discharge opening in alignment with the first-mentioned opening, a rotary valve rotatably mounted between said openings and forming a plurality of compartments of pre-determined size adapted to be moved successively into register with said first-mentioned opening, said valve having an end face upon which is formed a plurality of circumferentially spaced teeth, and means for effecting rotation of said valve in pre-determined increments so as to move said compartments into successive register with said first-mentioned opening, said means comprising a handle housing rotatably mounted in end to end relationship with respect to said end face, a pawl fixed with said handle housing and having a flexible finger which extends into the path of travel of said teeth for engagement therewith, retainer means fixed with said container support and extending into said handle housing for defining the rotative movement of said handle housing from an at-rest position to a dispensing position, and resilient means interconnected between said handle housing and said retainer for urging said handle housing to move into its at-rest position.

6. A dispenser comprising in combination a pedestal having a container support and a discharge opening formed in said support, a powder container carried by said container support and having a discharge opening in alignment with the first-mentioned opening, a rotary valve rotatably mounted between said openings and forming a plurality of compartments of pre-determined size adapted to be moved successively into register with said first-mentioned opening, said valve having an end face upon which is formed a plurality of circumferentially spaced teeth, and means for effecting rotation of said valve in pre-determined increments so as to move said compartments into successive register with said first-mentioned opening, said means comprising a handle housing rotatably mounted in end to end relationship with respect to said end face, a pawl fixed with said handle housing and having a flexible finger which extends into the path of travel of said teeth for engagement therewith, a handle retainer engaged with said handle housing and fixed against rotation therewith and defining the rotative movement of said handle housing from an at-rest position to a depressed position, and resilient means interconnected with said handle housing and said handle retainer for urging said handle housing to move into its at-rest position.

References Cited in the file of this patent

UNITED STATES PATENTS

| 910,246 | Travis | Jan. 19, 1909 |
| 2,401,684 | Gumilar | June 4, 1946 |
| 2,742,194 | Brown | Apr. 17, 1956 |

FOREIGN PATENTS

| 451,562 | Great Britain | Aug. 7, 1936 |